June 11, 1946.  J. M. MARKEL  2,402,064
MANURE LOADER
Filed Feb. 6, 1945  3 Sheets-Sheet 3
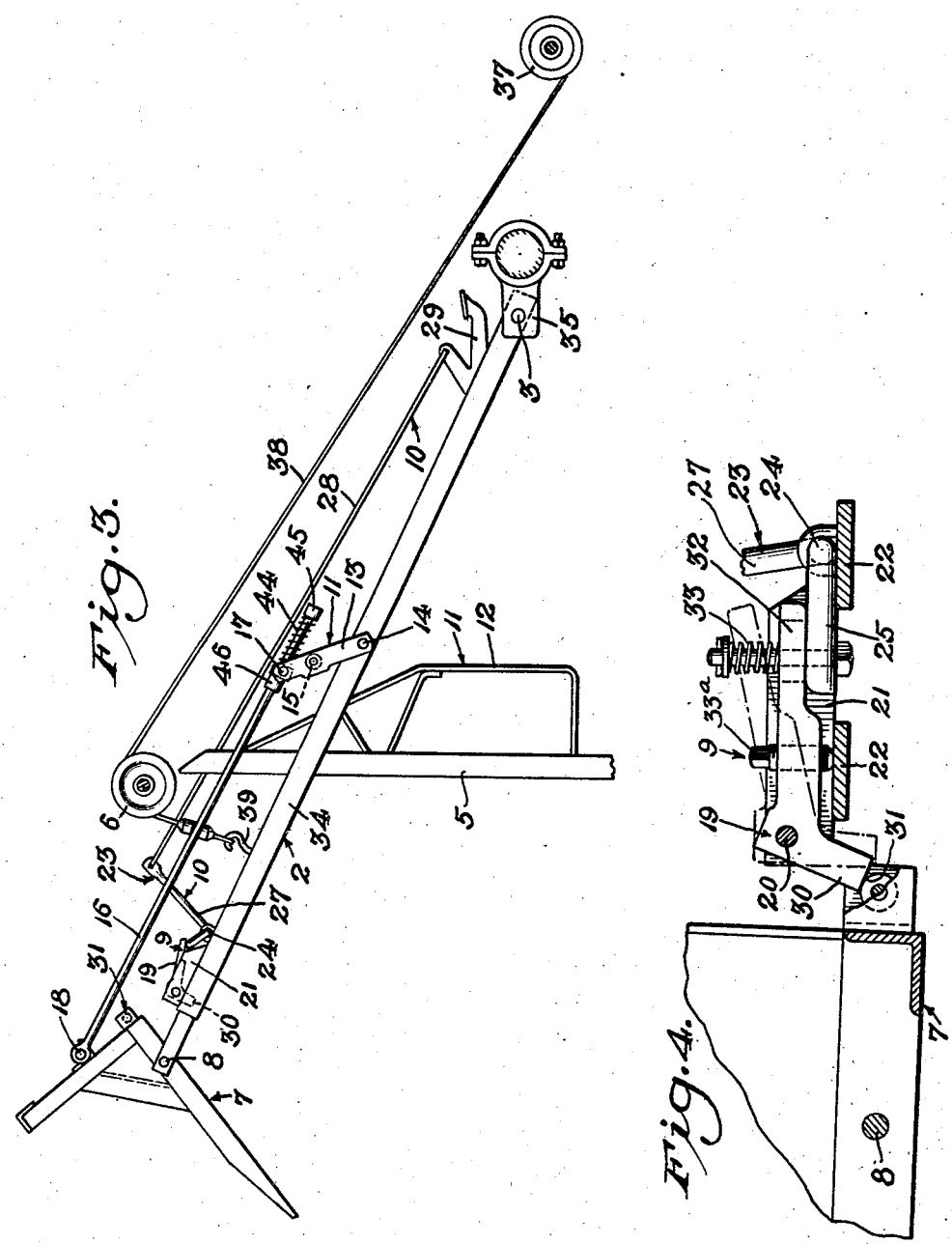
Inventor
John M. Markel
BY
Thiess, Olson + Mecklenburger
Attorneys.

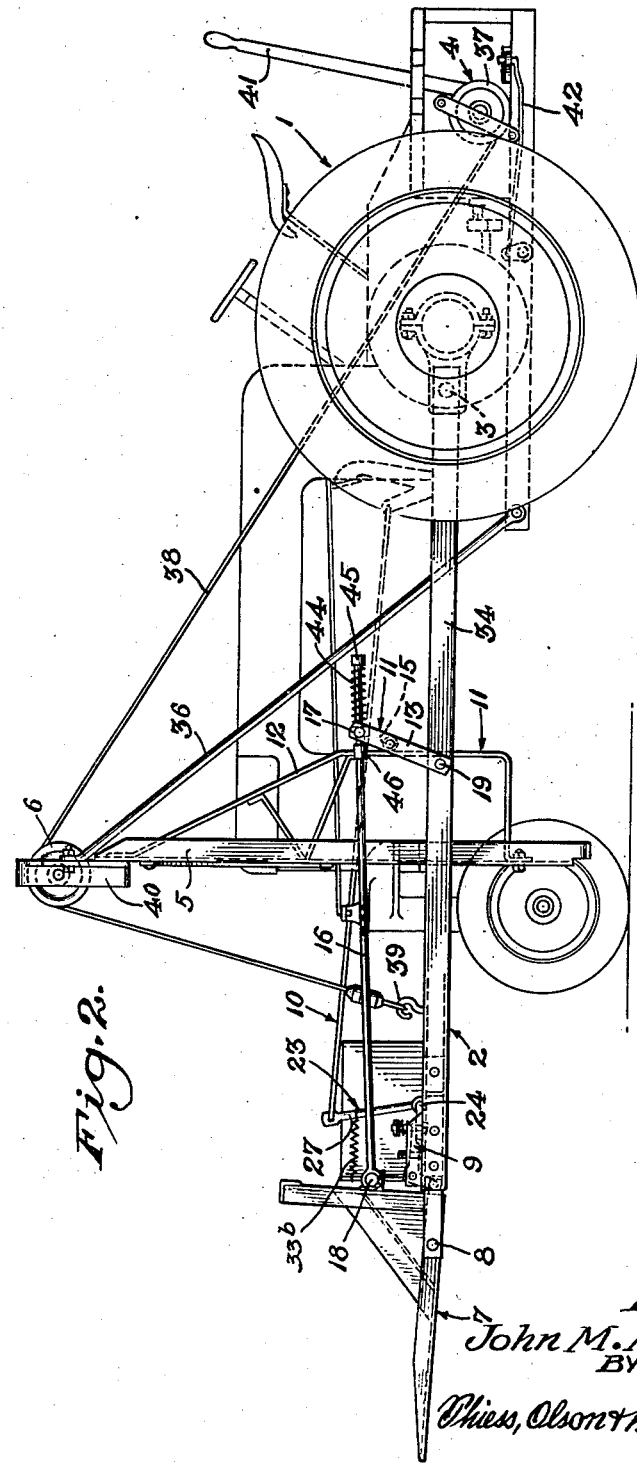

Patented June 11, 1946

2,402,064

UNITED STATES PATENT OFFICE 2,402,064

MANURE LOADER

John M. Markel, Rockford, Ill., assignor to J. I. Case Company, Racine, Wis., a corporation of Wisconsin Application February 6, 1945, Serial No. 576,425

4 Claims. (Cl. 214—140)

This invention relates to manure loaders.

One of the objects of my invention is to provide in a manure loader comprising a motor driven vehicle, a fork supporting boom pivotally mounted on said vehicle, means for raising and lowering said boom, a fork mounted on said boom for pivotal movement from a load-receiving and retaining position to a dumping position, latch means for holding said fork in load-retaining position, means for releasing said latch to enable the fork to move to dumping position, and force-transmitting means acting on said fork for causing said fork (as it moves from raised dumping position to lowered position) to move to load-receiving and retaining position and become latched in this position.

Further objects and advantages of the invention will be apparent from the description and claims.

In the drawings, in which an embodiment of my invention is shown,

Fig. 2 is a side elevational view of Fig. 1;

Fig. 3 is a somewhat diagrammatic view showing the loading apparatus in a different position; and Fig. 4 is an enlarged detail view of the latch mechanism.

Figure 1:
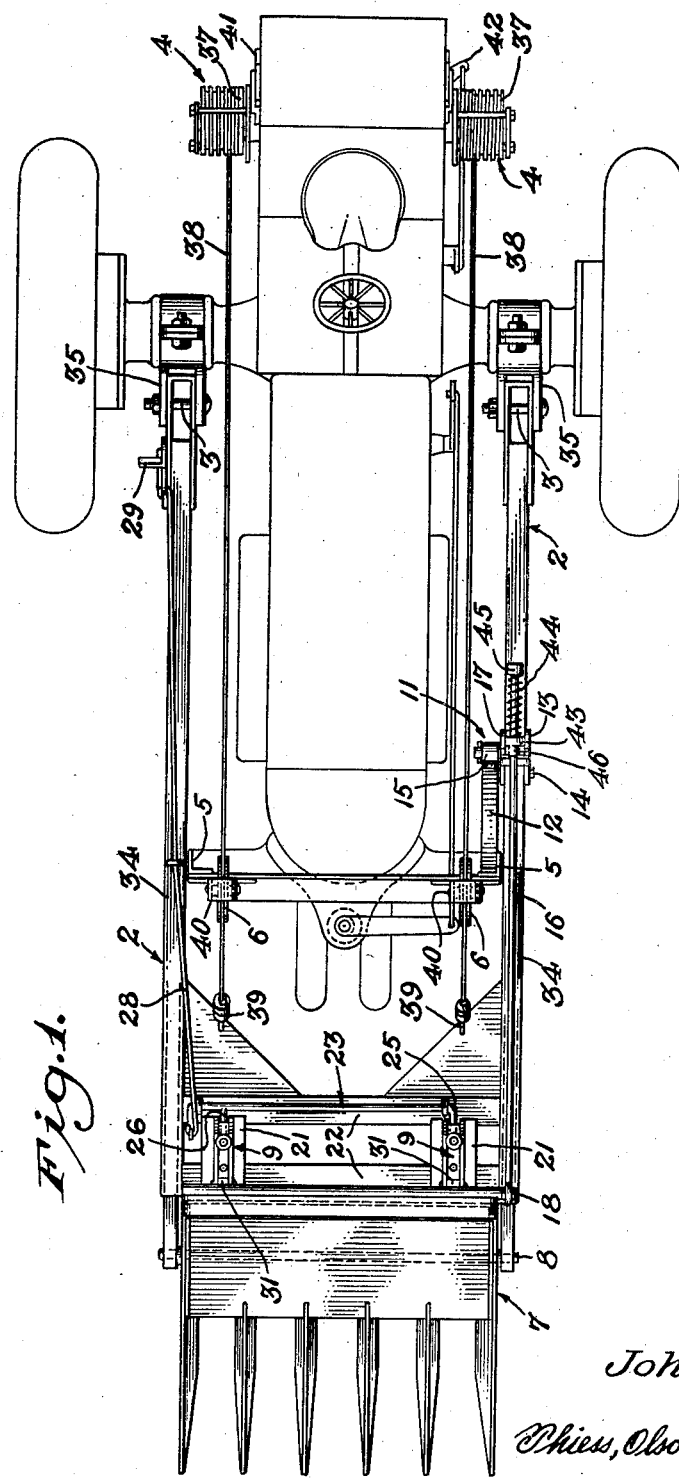
Figure 1 is a plan view of a tractor mounted loader.

Referring to the drawings in detail, the construction shown comprises a manure loader, including a motor driven vehicle 1 which may be any usual or suitable tractor, a fork-supporting boom 2 pivotally mounted on the vehicle at 3 adjacent the rear axle and extending forwardly therefrom, a windlass or winch transmission 4 for controlling the raising and lowering of the fork-carrying boom 2, a pair of upright guides 5 for guiding the boom in its raising and lowering movement and for supporting the pulleys or sheaves 6 at the upper end thereof, a fork 7 pivotally mounted at 8 on the boom 2 for swinging movement from a load-receiving and retaining position (as shown in Fig. 2) to a raised dumping position (as shown in Fig. 3), a pair of latch devices 9 mounted on opposite sides of the boom for automatically latching the fork 7 with respect to the boom in load-receiving and retaining position, manually controlled means 10 for releasing the latch when the boom is in raised position (as shown in Fig. 3) to enable the fork to move to dumping position, and cam means 11 for causing said fork (as it moves from raised dumping position to lowered position) to move to load-receiving and retaining position and become latched in this position.

The means for automatically resetting the fork and latching it as the boom is being lowered comprise an elongated cam rail 12 mounted on one of the upright guides 5, a cam follower lever 13 pivoted on the boom at 14 and carrying a follower roller 15 engageable with the elongated cam 12, and a link 16 pivotally connected at 17 with the follower arm and at 18 with the pivoted fork.

Each manually releasable latch device 9 (Fig. 4) comprises an L-shaped latch member 19 pivotally mounted at 20 in brackets 21 secured to crossbars 22 on the boom 2. These latch devices 9 are released by a latch-releasing bellcrank member 23, pivotally mounted at 24 on the crossbar 22 of the boom, having a pair of arms 25 and 26, one for releasing each latch member 19, and an actuating arm 27 pivotally connected by a trip rod 28 to a manually operable pedal 29 at the rear end of the tractor. Each latch member 19 has a swinging detent portion 30 for engagement with a detent roller 31 on the rear end of the fork 7 and a rearwardly extending lever arm 32 overlying an arm 25 or 26 on the bellcrank lever. An adjustable set screw 33$^a$ is threaded through the arm 32 and engages a crossbar 22 to limit the latching movement. A coil tension spring 33$^b$ is connected to the actuating arm 27 urging this arm toward latch-retaining position. Spring means 33 are provided, yieldingly connecting the arm 32 with an arm of the bellcrank lever, for urging the latch member toward latching position.

The boom 2 comprises a pair of spaced boom members 34 pivotally mounted at 3 on brackets 35 secured to the tractor. The boom is guided and steadied in its raising and lowering movement by engagement with the upright guides 5. Brace rods 36 may be provided for holding the uprights in upright position.

The apparatus for raising and lowering the boom comprises a pair of drums 37 driven from the motor through the power take-off, a pair of cables 38, each secured at one end to one of the drums and at its other end to the boom at 39, these cables running over the sheaves 6 mounted in the brackets 40 at the upper end of the uprights. A clutch lever 41 is provided for connecting the drum with the motor for raising movement, and a brake mechanism 42 is provided for controlling the lowering movement.

In order to insure that the cam rail 12 will cause the fork 7 to move to latched position as it is lowered, a spring-pressed slidable connection is provided between the cam follower lever 13 and the link 16. This connection comprises a sleeve 43 slidably mounted on the link 16 having a pivotal connection at 17 with the cam follower lever 13, a coil compression spring 44 surrounding the link 16 bearing at one end against an abutment 45 on the link and at the other end against the sleeve 43 and an abutment collar 46 fixedly mounted on the link 16, against which fixed collar the coil compression spring 44 urges the slidable sleeve 43. In operation, as the cam follower lever 13 is moved toward its extreme cam-controlled position, the slidable sleeve 43 may be held by the spring 44 snugly against the stop collar 46 until toward the final cam-controlled movement. The final cam-controlled movement, however, will cause the slidable collar 43 to separate somewhat from the stop collar 46, the coil compression spring enabling this separating movement and the slight excess movement of the cam follower lever 13.

In use, assuming that there is a pile of manure to be loaded located in front of the loader in the position shown in Fig. 2 and that it is desired to pick up a forkful and carry it over to a manure spreader which is to be loaded, the boom is brought to the desired position for insertion into the pile, for example, as shown in Fig. 2, and the tractor is propelled forwardly to insert the fork into the pile. If it is desired to take off of the top of the pile first, the fork will not be brought to its completely lowered position in this picking-up operation. When the fork has been inserted to the desired distance, the clutch lever 41 is operated to cause the boom to be raised to the desired height. If desired, means (not shown) may be provided for automatically limiting the distance to which the boom is raised. The tractor is then driven over in position to dump the forkful into the spreader. The operator then depresses the foot pedal 29 to release the latch members 19 and allow the fork to move by gravity to the load-releasing position shown in Fig. 3, allowing the load to fall into the spreader. The operator then goes back toward the pile for another forkful. As the loader is travelling, the brake may be released to allow the boom to move to its desired load-receiving position. As the boom moves downwardly, the cam follower 15 engages the elongated cam 12, causing the fork to straighten out and align itself with the boom and finally to latch the fork with respect to the boom by the engagement of the roller 31 underneath the latch 30.

Further modifications will be apparent to those skilled in the art and it is desired, therefore, that the invention be limited only by the scope of the appended claims.

Having thus described my invention, what I claim and desire to secure by Letters Patent is:

1. A manure loader comprising a motor driven vehicle, a fork supporting boom pivotally mounted on said vehicle, means for raising and lowering said boom, a fork mounted on said boom for pivotal movement from a load-receiving and retaining position to a dumping position, latch means for holding said fork in load-retaining position, means for releasing said latch to enable the fork to move to dumping position, and force transmitting means acting on said fork for causing said fork, as it moves from raised dumping position to lowered position, to move to load-receiving and retaining position and become latched in this position, said force transmitting means comprising a cam mounted on said vehicle and a cam follower mounted on said boom.

2. A manure loader comprising a motor driven vehicle, a fork supporting boom pivotally mounted on said vehicle, means for raising and lowering said boom, a fork mounted on said boom for movement from a load-receiving and retaining position to a dumping position, latch means for holding said fork in load-retaining position, means for releasing said latch to enable the fork to move to dumping position, and force transmitting means acting on said fork for causing said fork, as it moves from raised dumping position to lowered position, to move to load-receiving and retaining position and become latched in this position, said force transmitting means comprising a cam mounted on said vehicle and a cam follower mounted on said boom.

3. A manure loader comprising a motor driven vehicle, a fork supporting boom pivotally mounted on said vehicle, means for raising and lowering said boom, a fork mounted on said boom for movement from a load-receiving and retaining position to a dumping position, latch means for holding said fork in load-retaining position, means for releasing said latch to enable the fork to move to dumping position, and force transmitting means acting on said fork for causing said fork, as it moves from raised dumping position to lowered position, to move to load-receiving and retaining position and become latched in this position, said force transmitting means comprising a cam mounted on said vehicle, a cam follower mounted on said boom, and a link pivotally connected with said fork and cam follower.

4. A manure loader comprising a motor driven vehicle, a fork supporting boom pivotally mounted on said vehicle, means for raising and lowering said boom, a fork mounted on said boom for movement from a load-receiving and retaining position to a dumping position, latch means for holding said fork in load-retaining position, means for releasing said latch to enable the fork to move to dumping position, and force transmitting means acting on said fork for causing said fork, as it moves from raised dumping position to lowered position, to move to load-receiving and retaining position and become latched in this position, said force transmitting means comprising a cam mounted on said vehicle, a cam follower mounted on said boom, and a yielding lost motion link pivotally connected with said fork and cam follower.

JOHN M. MARKEL.